D. ELTERICH.
WHEELBARROW.
APPLICATION FILED JAN. 20, 1913.

1,095,145.

Patented Apr. 28, 1914.

WITNESSES:
F. C. Matheny
E. Piterson

INVENTOR:
David Elterich
BY
Pierre Barnes
ATTORNEY

UNITED STATES PATENT OFFICE.

DAVID ELTERICH, OF FORKS, WASHINGTON.

WHEELBARROW.

1,095,145.   Specification of Letters Patent.   Patented Apr. 28, 1914.

Application filed January 20, 1913. Serial No. 743,014.

*To all whom it may concern:*

Be it known that I, DAVID ELTERICH, a citizen of the United States, residing at Forks, in the county of Clallam and State of Washington, have invented certain new and useful Improvements in Wheelbarrows, of which the following is a specification.

My invention relates to wheelbarrows; and has for its object the provision of a second or trailer-wheel which in use tracks upon the ground and serves to relieve the operator of the weight of the load when moving the barrow.

The invention is illustrated in the accompanying drawings, wherein—

Figure 1:
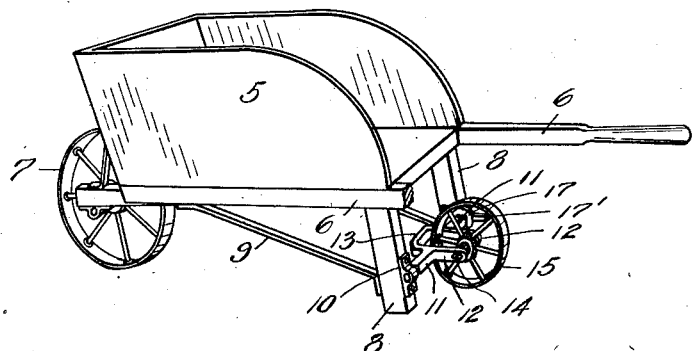
Figure 2:
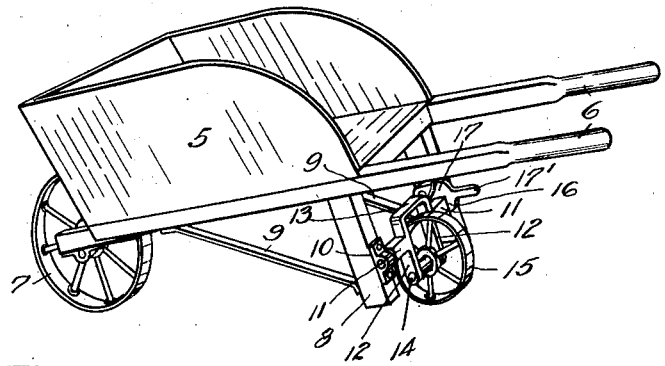
Figure 3:
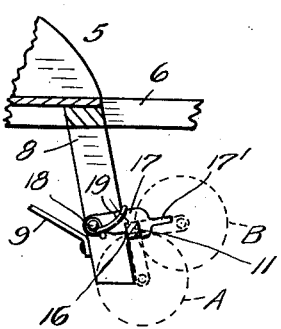

Figure 1 is a perspective view of a barrow embodying my improved rear wheel appliances. Fig. 2 is a similar view with the appliances illustrated in a different position from which they are shown in Fig. 1. Fig. 3 is a fragmentary longitudinal vertical section of the barrow.

The reference numeral 5 designates the body of a barrow which may be of any suitable shape or type and is supported upon handle-bars 6. At the forward ends of the handle-bars are boxes for the axle of the usual wheel 7. Depending from said bars are legs 8 which, as shown, are further secured by braces 9. Secured to each of said legs is a journal box 10 for the gudgeons provided at the extremities of branches 11 which protrude laterally from a substantially U-shaped frame. This frame is comprised of parallel longitudinal members 12 which are connected from corresponding ends by a transverse member 13. At the opposite ends of members 12 from the member 13 they are provided with bearing holes for the journals of an axle 14 upon which is mounted a wheel 15. The branches 11 are desirably rectangular in cross section to enable the same to be engaged in a correspondingly shaped recess 16 provided in a latch-arm 17 which is pivotally connected by a pin 18 to one of the legs 8, as shown. The arm 17 is extended, as at 17¹, sufficiently beyond the branch with which it engages to enable the operator to kick the arm upwardly for releasing the frame therefrom when desired.

19 is a spring to yieldingly retain the latch-arm 17 in engaged position.

The frame which carries the wheel 15 is pivotally connected by its gudgeons to the barrow legs 8 at such a height that the wheel will occupy the position in which it is shown in Fig. 2 and indicated by broken lines A in Fig. 3 when the frame is in a substantially upright position in which it is illustrated in Fig. 2. The frame may be thus held through the instrumentality of the latch-arm 17. When, however, the latch-arm is kicked up out of engagement with the frame and the latter is swung into a horizontal position, as shown in Fig. 1, the wheel 15 will thereby be swung clear of the ground as represented in Fig. 1 and as indicated by broken lines B in Fig. 3. By such devices the operator may employ the wheel 15 with the other wheel 7 for supporting the barrow when conveying a load, or the wheel 15 may be swung away from the ground to have the barrow supported by the wheel 7 and the legs 8 when loading.

The invention is extremely simple and of inexpensive construction, easy to operate, and serves to relieve the operator of a relatively large part of the labor in handling a loaded barrow.

What I claim, is—

In a wheelbarrow, the combination with the barrow legs, boxes secured thereto, a frame provided with gudgeons which are journaled in said boxes, a wheel, an axle therefor, said axle being journaled in said frame, and means for securing said frame in positions to present the wheel either above or below the lower ends of said legs.

Signed at Seattle, Wash., this 27th day of December 1912.

DAVID ELTERICH.

Witnesses:
 PIERRE BARNES,
 E. PETERSON.